United States Patent
Burkin et al.

[11] 3,875,659
[45] Apr. 8, 1975

[54] METHOD AND APPARATUS FOR SUCCESSIVE DELIVERY AND POSITIONING OF POLE CORES AND DEVICE FOR EFFECTING SAME

[76] Inventors: Jury Alexandrovich Burkin, Tsvetnoi proezed 29 kv. 24; Jury Emelyanovich Seleznev, Vesenny proezed 4A kv. 16, both of Novosibirsk, U.S.S.R.

[22] Filed: Dec. 6, 1973

[21] Appl. No.: 422,150

[30] Foreign Application Priority Data
Dec. 18, 1972 U.S.S.R............................ 1862530

[52] U.S. Cl. .......... 29/604; 29/203 MM; 29/240.5; 29/241; 29/433; 214/8.5 K
[51] Int. Cl. ............................................ H01f 7/06
[58] Field of Search ....... 29/203 MM, 203 P, 200 P, 29/211 R, 604, 240.5, 241, 433, 456; 340/174 MA; 214/8.5 K

[56] References Cited
UNITED STATES PATENTS

| | | | |
|---|---|---|---|
| 3,310,865 | 3/1967 | Schelling | 29/604 |
| 3,584,362 | 6/1971 | Hazel et al. | 29/203 MM |
| 3,719,989 | 3/1973 | Fagerstrom et al. | 29/604 |

*Primary Examiner*—Carl E. Hall
*Attorney, Agent, or Firm*—Holman & Stern

[57] ABSTRACT

A method for successive delivery and positioning of pole cores. The pole cores are strung in a stack upon a wire, the stack being prevented from sliding down along the wire by means of a stop. The lower pole core in the stack is pressed against an additional member, and the upper portion of the wire with the stack is bent along the profile of the additional member so that the lower pole core is delivered, in an oriented position, for threading, counting or checking, the lower pole core being removed following a completion of one of said operations. A device for effecting the above method comprises a wire with pole cores strung in a stack thereon, movable wire holders, a stop disposed under the stack, and an additional member which is a profiled prism-shaped strip.

3 Claims, 4 Drawing Figures

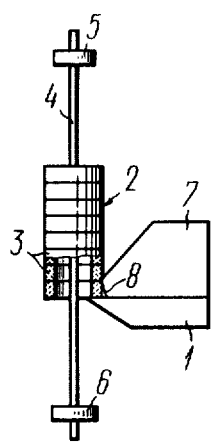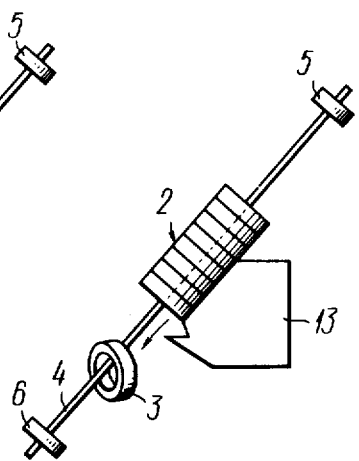
FIG. 2   FIG. 3   FIG. 4

METHOD AND APPARATUS FOR SUCCESSIVE DELIVERY AND POSITIONING OF POLE CORES AND DEVICE FOR EFFECTING SAME

BACKGROUND OF THE INVENTION

The present invention relates to methods for manufacturing pole core memories as part of the fabrication of memory matrices for computers, and more particularly, to a method for the successive delivery and positioning of pole cores and a device for effecting same.

The invention may be utilized for the successive delivery and positioning of pole cores of all sizes, including subminiature pole cores, strung in a stack upon a wire, in the course of threading pole cores with coiled wire, as well as counting or quality checking of pole cores.

In order to carry out the operations of threading pole cores with coiled wire, as well as of counting or quality control of pole cores, a pole core is separated from a stack of pole cores, delivered to a certain place and positioned there.

Different methods are presently known for the successive delivery and positioning of pole cores. A method for successive delivery and positioning of pole cores and a device for effecting same may be applicable both when pole cores are strung in a stack upon a wire, and when pole cores are strung in stacks upon wires. A particular known method consists in that pole cores are, first strung in stacks on wires which are then arranged in a row and secured in wire holders under slight tension.

A stop prevents the stacks of pole cores from sliding downward along the wires. The sharp edge of a profiled comb is introduced into the clearance between the lower pole cores in the stacks and the remaining pole cores and separates one pole core on each wire from the remaining pole cores, after which the stop is drawn aside, and the separated pole cores move down along the wires. Then, these pole cores are oriented in a preset direction, which means that each pole core is arranged at an angle of 45° to the inner wire in one or the other direction, according to a predetermined topological circuit of the memory matrix.

The above method is employed in the currently practice manual fabrication of memory matrices.

A disadvantage of the known method for the successive delivery and positioning of pole cores resides in the difficulties involved in separating pole cores from stacks and positioning these cores This operation often damages and even completely destroys pole cores and rules out employment of the above method in the manufacture of subminiature pole cores.

The foregoing method for the successive delivery and positioning of poles cores utilized with regard to relatively large pole cores with an outer diameter of upward of 1 mm, has made it possible to evolve a device for effecting the method. The device comprises wire holders supporting a row of wires with pole cores strung in stacks thereon. A pole core deflector is arranged transversely to the wires and comprises a stop and a profiled comb having a sharp edge. Between the stop and the profiled comb, a packing strip is disposed whose thickness is equal to the height of a pole core. A pole core positioner is arranged parallel to the pole core and is made as a series of combs which serve to position the pole cores.

The foregoing device is too complicated and necessitates precision manufacturing of a large number of components.

At present, such devices are used for threading memory matrices having pole cores whose outer diameter is upwardly of 1 mm. Attempts to produce a similar device for handling pole cores having an outer diameter of 0.8 mm have thus far been unsuccessful, notwithstanding the fact that practical purposes necessitate threading pole cores having an outer diameter from 0.6 down to 0.3, and over 2.0 mm.

The treading of pole cores is an operation which up to the present has been done manually. Clearly, when applied to pole cores of extremely small diameter, this operation has to be fully automated. A human being is totally incapable of performing this Operation, so low efficiency of manual threading, accompanied by a steadily growing demand for pole core storage systems, makes the automation of this process an economic necessity.

A disadvantage of the foregoing device for effecting the method of the successive delivery and positioning of pole cores resides in inadequate accuracy of separating pole cores from stacks, as well as damaging and even complete destruction of pole cores by the edge of the profiled comb and by the combs of the positioner. This produces great strain on the operators eyes, reduces labor productivity and hampers full automation of the manufacturing process; in the case of subminiature pole cores, which possess the properties of a speck of dust, the above disadvantages make it absolutely impossible to produce such a device.

SUMMARY OF THE INVENTION

It is an object of the present invention to provide a method for the successive delivery and positioning of pole cores and a device for effecting the method, which raises the reliability of separating pole cores strung on a wire, in the case of pole cores of all sizes, including those of subminiature size, relieves the strain on the operator's eyes and raises labor productivity and the quality of articles being manufact The above and other objects of the present invention are attained by providing a method for the successive delivery and positioning of pole cores strung in a stack upon wire, the stack pf the pole cores being prevented from sliding down the wire by a stop, with subsequently carrying out such operations as threading the pole cores with coiled wire, counting them and performing their quality control, whereby, in accordance with the invention, the lower pole core in the stack is pressed against an additional member, and the upper portion of the wire with the stack of the pole cores is bent along the profile of the additional member, thereby delivering and positioning a pole core, whereupon, following one of the above operations of threading, counting or quality control, the lower portion of the wire is displaced in the direction of unbending that wire and the lower pole core is removed.

In accordance with the foregoing and other objects of the present invention, the latter essentially resides in that a device for effecting the method for the successive delivery and positioning of pole cores, comprising at least one wire with pole cores strung in a stack thereupon, a stop disposed under the stack of pole cores, in immediate proximity to the wire, and wire holders, is provided, according to the invention, with an additional member mounted on the stop, in immediate proximity to the stack of pole cores, which additional member is made in the form of a profiled prism-shaped strip, one facet of the prism facing the wire, the width thereof being equal to the height of a pole core, whereas the adjacent facet of the prism, disposed above the foregoing facet, is slanted, the wire holders being made movable.

It is expedient that in the proposed device, the stop and the profiled strip are an integral member.

BRIEF DESCRIPTION OF THE DRAWINGS.

Other objects and advantages of the present invention will be more fully understood from the following detailed description of preferred embodiments thereof when read in conjunction with the accompanying drawings, wherein:

FIG. 2 shows part of the device for effecting the method for successive delivery and positioning of pole cores before the start of operation, in accordance with the invention;

FIG. 3 shows part of the device for effecting the method for the successive delivery and positioning of pole cores and explains the ways a pole core is delivered and positioned, in accordance with the invention;

FIG. 4 shows part of the device for effecting the method for successive delivery and positioning of pole cores and explains the operation of removing a pole core, in accordance with the invention.

DETAILED DESCRIPTION OF PREFERRED EMBODIMENTS

Figure 1:
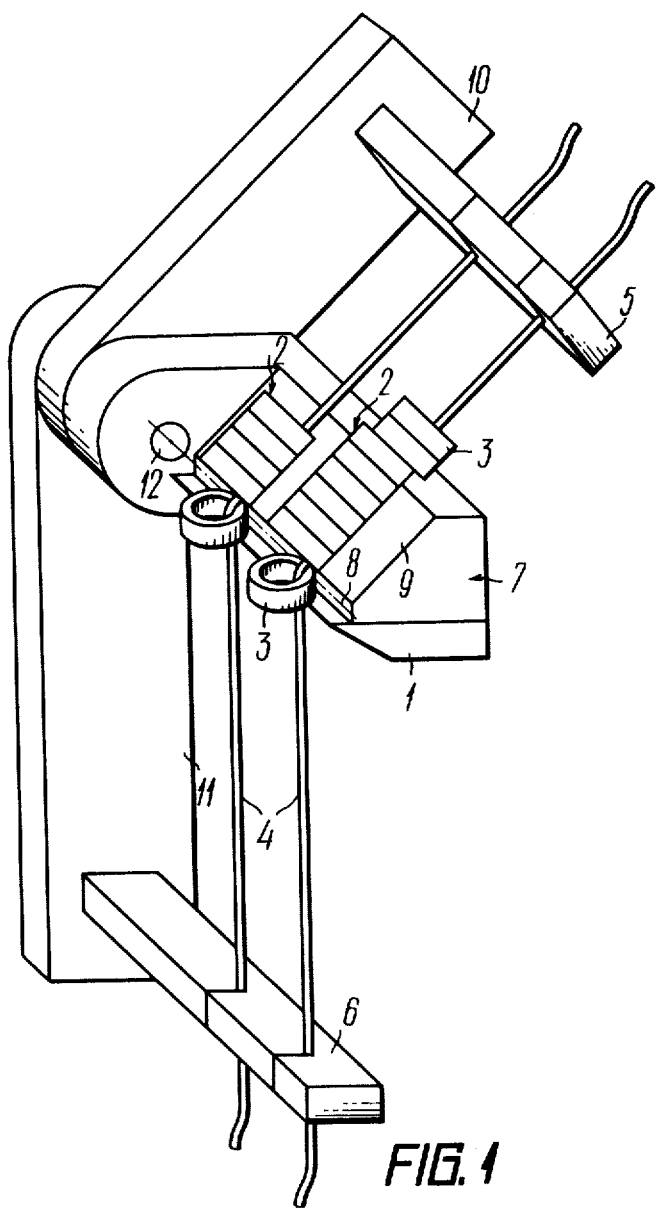
FIG. 1 shows a device for effecting the method for successive delivery and positioning of pole cores in accordance with the invention.

Referring to FIG. 1, the device for the successive delivery and positioning of pole cores according to the invention comprises a stop 1 which prevents a stack 2 of pole cores 3 from sliding downward along a wire 4 upon which they are strung. Discussed hereinafter is an embodiment of the device of the invention having two stacks 2 of pole cores 3 strung upon wires 4. The stop 1 is disposed under the stack 2, in immediate proximity to the wire 4. The wires 4 are spaced equidistantly along the stop 1 and secured, under slight tension, in holders 5 and 6 of the wires 4, the holders being arranged above and below the stop 1, respectively. An additional member, which is a profiled prism-shaped strip 7, is mounted upon the stop 1, in immediate proximity to the stack 2, the prism having two adjacent facets 8 and 9. The facet 8 faces the wires 4 with the pole cores 3 strung in the stacks 2 thereon, the width of that facet being equal to the height of the pole core 3. The facet 9 is above the facet 8 and is slanted with respect to the latter at an angle of 30° to 60°. The value of the latter angle determines the extent of removal of the pole cores 3 separated from the stacks 2 of the pole cores 3, which are delivered and positioned for threading, quality control or counting. If it is sufficient to transfer the pole cores 3 over a small distance from the stacks 2, the angle at which the facet 9 is slanted with respect to the facet 8 may be small; in order to transfer the pole cores 3 over a greater distance from the stacks 2, the latter angle is larger.

The holders 5 and 6 of the wires 4 are made in the form of notches provided in rubber strips which are secured at the ends of movable levers 10 and 11. The movable levers 10 and 11 are capable of being displaced with regard to an axle 12. The axis of the axle 12 passes through the bending points of the wires 4 and through the pole cores 3 which are separated, delivered and positioned for threading or quality control. This means that axis is found apart from the plane of the stop 1, which prevents the pole cores 3 from sliding down the wires 4, at a value equal to the height of the pole core 3; this also means that the axis is apart from the facet 8 of the profiled strip 7 at a distance equal to the difference between the inner and outer radii of the pole core 3.

Another practicable embodiment of the device of the invention envisages the stop 1 and the profiled strip 7 in the form of a single member 13 (FIG. 4). In the latter case, the foregoing details concerning the dimensions and arrangement of the components of the device remain unchanged.

The width of the edge of the stop 1 (FIG. 1) protruding beyond the profiled strip 7 is equal to the difference between the inner and outer radii of the pole core 3.

The operation of the device of the invention which is discussed in conjunction with the essentials of the proposed method will now be considered.

As is seen from FIG. 2, which shows part of the device prior to the start of operation and explains the essence of the method for the successive delivery and positioning of pole cores, the pole cores 3 are first strung in the stacks 2 upon the wires 4, and sliding of the pole cores 3 downward along the wire 4 is prevented by the stop 1. The straight wire 4 is secured, under slight tension, in the holders 5 and 6. The wire 4 is so arranged in relation to the stop 1 that it slightly touches the edge of the stop 1 and is pressed against the latter due to its tension.

The pole cores 3 are held against the stop 1 under gravity. In the case of subminiature pole cores 3, which possess the properties of specks of dust, these are not pressed tightly enough against one another to form the stack 2 and are pressed against the stop 1 under gravity. In the latter case, the stack 2 of the pole cores 3 is compressed by an additional lead (not shown) strung upon the wire 4 above the stack 2 of the pole cores 3.

Prior to the start of operation, the lower pole core 3 is opposite the facet 8 of the profiled strip 7, in immediate proximity to the latter, and is pressed tightly against the stop 1.

The lower pole core 3 is then pressed against the facet 8 of the profiled strip 7 by the wire 4. The upper portion of the wire 4 (FIG. 3) with the stack 2 of the pole cores 3 is bent along the profile of the additional member; as this takes place, the lower pole core 3 in the stack 2 retains its original position, whereas the stack 2 with the remaining pole cores 3 is found resting upon the facet 9 of the additional member. Thus, the lower pole core 3, which retains its original position, is set apart from the stack 2 with the remainder of the pole cores 3.

The lower pole core 3 is delivered, in an oriented position, for carrying out the operations of threading, quality control or counting.

After the completion of one of the above operations, the lower pole core 3 is removed, for which purpose the lower portion of the wire 4 is displaced, together with the holder 6, in the direction of unbending that wire, without releasing the tension thereof. That displacement cannot be effected until the wire 4 is straightened out completely and the facet 9 is relieved of the pressure of the stack 2 of the pole cores 3. Normally, the pole core 3 slides down before the above position has been attained, due to the fact that the height of the standard pole cores 3 is invariably somewhat greater than the width thereof, which is equal to the difference between the inner and outer radil radii of the pole core 3.

The subsequent operation of the device proceeds as has been described hereinabove.

The method for the successive delivery and positioning of pole cores and the device for effecting same is, especially valuable for the mechanized threading of memory matrices with coiled wire. In the case of utilizing the present invention for threading with the aid of a needle having a conductive wire secured at the end thereof, the stop 1 and the additional member are profiled in an appropriate manner.

The invention may be applicable for subminiature pole cores having an outer diameter of 0.6 to less than 0.3 mm and reduces spoilage of pole cores.

What is claimed is:

1. A method for the successive separation and positioning of pole cores, which method comprises the steps of: stringing pole cores in a stack upon a wire; preventing the pole cores from sliding down the wire by a stop; pressing the lower pole core in the stack against a member; bending the upper portion of the wire with the stack along the profile of the member, thus positioning the lower pole core in the stack and separating said lower pole core from the remaining cores in the stack, whereupon, following the operations of threading of said pole core with coiled wire, and quality control thereof, the lower portion of the wire is displaced in the direction of unbending of the wire, and the lower pole core is moved along the wire.

2. A device for effecting the successive separation and positioning of an individual pole core from a stack of pole cores, comprising: stop means disposed under a stack of pole cores strung on at least one wire, and in immediate proximity to the wire; a plurality of movable holders of the wire,; a memeber mounted upon said stop means in immediate proximity to the stack of pole cores, said member being formed as a profiled prism-shaped strip, with one facet thereof facing the wire, its width being equal to the height of a pole core, whereas the other, adjacent, facet of said strip is above said one facet and is slanted relative thereto.

3. A device as claimed in claim 2, wherein said stop means and said profiled strip are formed as an integral member.

* * * * *